United States Patent [19]

Randell et al.

[11] 4,251,493
[45] Feb. 17, 1981

[54] GAS PURIFICATION PROCESS

[75] Inventors: Donald R. Randell, Stockport; Emyr Phillips, Sale, both of England

[73] Assignee: Ciba-Geigy Corporation, Ardsley, N.Y.

[21] Appl. No.: 57,154

[22] Filed: Jul. 12, 1979

[30] Foreign Application Priority Data

Jul. 21, 1978 [GB] United Kingdom ............... 30844/78

[51] Int. Cl.³ ............................................. B01D 53/34
[52] U.S. Cl. ................................... 423/226; 423/224; 423/573 G
[58] Field of Search ........... 423/210, 224, 226, 573 R, 423/573.6

[56] References Cited

U.S. PATENT DOCUMENTS

| 2,997,439 | 8/1961 | Nicklin et al. | 208/231 |
| 3,035,889 | 5/1962 | Nicklin et al. | 423/226 X |
| 3,627,791 | 12/1971 | Grisar et al. | 260/371 |
| 4,002,727 | 1/1977 | Sonoda et al. | 423/573 R |
| 4,049,776 | 9/1977 | Nicklin et al. | 423/226 |

FOREIGN PATENT DOCUMENTS

| 871233 | 6/1961 | United Kingdom | 423/226 |
| 948270 | 1/1964 | United Kingdom | 423/226 |

OTHER PUBLICATIONS

Chemical Abstracts, 49, 2744e (1955).
Chemical Abstracts; 61, 8109f, 1964.
Chemical Abstracts; 31, 7778⁸, 1937.

*Primary Examiner*—Earl C. Thomas
*Attorney, Agent, or Firm*—Luther A. R. Hall

[57] ABSTRACT

Processes for the absorption and subsequent removal as sulphur of hydrogen sulphide from gases, gas mixtures and liquid hydrocarbons in which the material containing hydrogen sulphide is washed with an aqueous alkaline solution containing one or more compounds having the general formula:

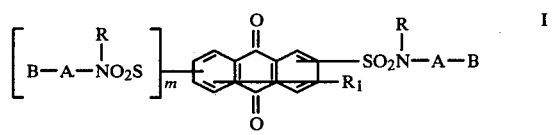

where
A is a $C_1$-$C_4$ straight or branched chain alkylene radical,
B is a $-SO_3M$, $-CO_2M$, $-PO_3HM$ or $-PO_3M_2$ grouping, where
M is hydrogen, or a cation giving a water-soluble derivative,
R is hydrogen, a cation giving a water-soluble derivative, or $C_1$-$C_4$ straight or branched alkyl,
$R_1$ is hydrogen, methyl or $-COOH$ and m is 0 or 1
the hydrogen sulphide being oxidized and sulphur liberated, and the reduced anthraquinone sulphonamide being oxidized by contact with free oxygen or a gas containing it, and optionally there being present in addition a metal having at least two valency states, and if necessary a chelating or sequestering agent for retaining such metal compounds in solution.

6 Claims, 2 Drawing Figures

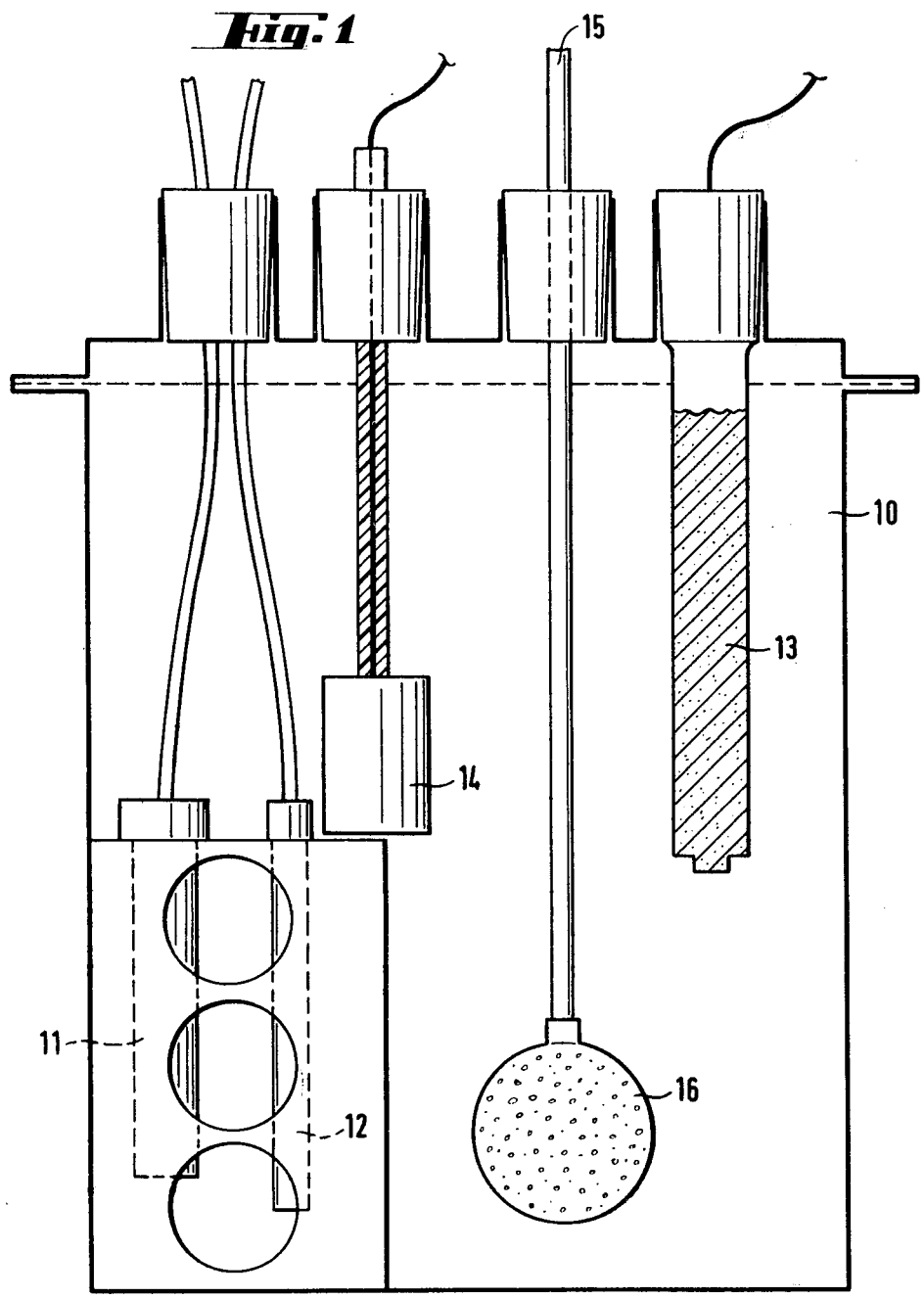

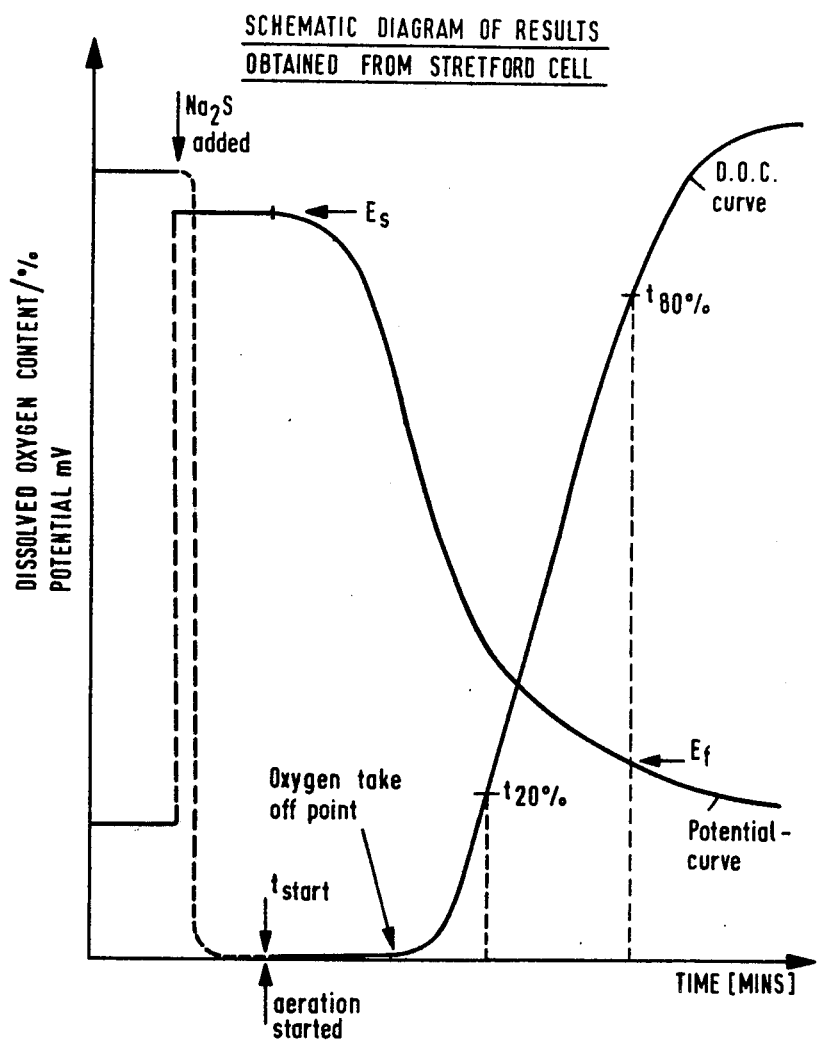

GAS PURIFICATION PROCESS

The present invention relates to a purification process especially to a process for removing hydrogen sulphide from gases or liquid hydrocarbons containing it as impurity.

The removal of hydrogen sulphide as sulphur from gases is described in British Pat. Nos. 871,233 and 948,270 in which certain anthraquinone disulphonic acids are used. We have found surprisingly that certain anthraquinone sulphonamides as hereinafter defined have at least as good or superior activity to the anthraquinone disulphonic acids used in the removal of hydrogen sulphide as sulphur from gases by the methods described in the above patents.

According to the present invention there is provided a process for the absorption and subsequent removal as sulphur of hydrogen sulphide from gases or gas mixtures where the gas or gas mixture is washed with an aqueous alkaline solution of one or more anthraquinone sulphonamides having the formula

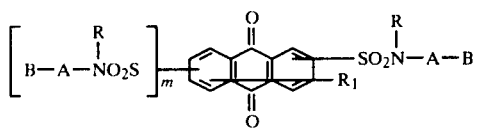

where A is a $C_1$–$C_4$ straight or branched chain alkylene radical, B is a —$SO_3M$, —$CO_2M$, —$PO_3HM$ or —$PO_3M_2$ grouping, where M is hydrogen, or a cation giving a water-soluble derivative, R is hydrogen, or a cation giving a water-soluble derivative or $C_1$–$C_4$ straight or branched chain alkyl.

$R_1$ is hydrogen, methyl or —COOH, and m is 0 or 1, whereby the hydrogen sulphide is oxidised and sulphur is liberated, and the reduced anthraquinone sulphonamide is oxidised by contact with free oxygen or a gas containing it.

The present invention further provides a process for the absorption and subsequent removal as sulphur of hydrogen sulphide from gases, gas mixtures and liquid hydrocarbons, in which the material containing hydrogen sulphide is washed with an aqueous alkaline solution containing one or more compounds of the above formula I, one or more compounds of a metal having at least two valency states, and if necessary one or more chelating or sequestering agents for retaining such metal compounds in solution.

When M or R is a cation giving a water-soluble derivative this is preferably an alkali metal, for example, sodium or potassium, or an unsubstituted or substituted ammonium cation for example ammonium or optionally substituted $C_1$–$C_6$ alkylammonium, examples of alkyl substituents being methyl, ethyl, propyl, butyl or mono-, di-, or tri-hydroxyethyl.

Preferably, B is a —$SO_3M$ grouping, $R_1$ is hydrogen and M and R are hydrogen, sodium, potassium or ammonium. More preferably B is a —$SO_3M$ grouping, $R_1$ is hydrogen and M and R are hydrogen, sodium, potassium or ammonium and A is a $C_1$–$C_4$ straight chain alkylene grouping. Especially preferred compounds are those in which $R_1$ is hydrogen, M and R are hydrogen, sodium, potassium or ammonium and A is methylene or ethylene and m is 1.

The compounds of formula I and their methods of preparation are described in detail in our co-pending U.S. patent application Ser. No. 57,157.

Examples of preferred compounds for use in the processes of the present invention are the di- and tetrasodium, potassium and ammonium salts of N,N'-disulphomethylanthraquinone-2,6-disulphonamide, N,N'-disulphomethylanthraquinone-2,7-disulphonamide, N,N'-disulphomethylanthraquinone-1,5-disulphonamide, N,N'-disulpho-2'-ethylanthraquinone-2,6-disulphonamide N,N'-dicarboxymethylanthraquinone-2,6-disulphonamide and N,N'-dicarboxymethylanthraquinone-2,7-disulphonamide and mixtures thereof.

In a recent development, our co-pending U.S. patent application Ser. No. 57,153 discloses the use, in the process of BP 948 270 of a sequestering agent comprising a compound containing at least one phosphonic acid grouping. Such sequestering agents may be used in this embodiment of the present invention.

The compound of a metal having at least two valency states may be an ortho-, meta-, or pyrovanadate of ammonia or of an alkali metal for example sodium ammonium vanadate or sodium orthovanadate. The two upper valency states of vanadium are preferably used.

When a vanadium compound is used as the compound of a metal having at least two valency states, an effective ratio of the compound of formula I to the vanadium compound is conveniently in the range of 3:1 to 1:2, preferably 2:1 to 1:1 and especially 2:1.5 by weight provided that the ratio of vanadium to hydrogen sulphide is 2:1.

It is desirable to use a compound of formula I which is substantially free of halogen ions since the presence of halogen ions, particularly chloride ions causes corrosion problems in the plant. The compound of formula I should therefore preferably be prepared from the corresponding anthraquinone sulphonamide rather than the anthraquinone sulphonyl halide.

A particular advantage of a mixture of anthraquinone 2,6 and 2,7-disulphonamides of formula I is that they have improved solubility over the corresponding mixture of disulphonic acids.

The following Examples further illustrate the present invention.

EXAMPLES 1 TO 8

Some laboratory tests were carred out to show the effectiveness of the compounds of the present invention as catalysts in the removal of $H_2S$ from gases, and to show that these compounds are superior to 2,7-anthraquinone disulphonic acid.

To carry out the test a synthetic simulation of a gas-absorbing solution is prepared to give:

| | |
|---|---|
| 25g/l | $NaHCO_3$ |
| 5g/l | $Na_2CO_3$ |
| 10g/l | $Na_2S_2O_3$ |
| 8g/l | NaCNS |
| 3.8g/l | $NaVO_3$ |
| 2g/l | Catalyst |

The test solution has a solution pH of 9.0-9.2.

The cell in which the tests were carried out is illustrated in the accompanying FIG. 1 in which the cell 10 consists of a nominally 1 liter vessel containing an oxygen electrode 11, a temperature compensation probe 12, calomel electrode 13, platinum electrode 14, air inlet 15, and an aeration sintered disc 16.

The dissolved oxygen content is measured on an E.I.L. dissolved oxygen meter and the redox potential measured on a high impedance digital multimeter.

PROCEDURE

Prepare 1.5 liters of simulated gas-absorbing solution. Transfer 1 liter of the solution to the Cell, where the solution is oxygenated and de-oxygenated three times by alternately passing air and nitrogen at flow rates of 500 mls/min. The solution is finally left in a de-oxygenated state.

A minimum amount of the de-oxygenated solution is used to dissolve 3.75 g of $Na_2S$ which is then returned to the Cell. Although the process is for the removal of $H_2S$ the species formed when $H_2S$ dissolves in an alkaline absorbing solution is the $HS^-$ ion. Therefore, for ease of operation of the test it was decided to introduce the $HS^-$ ion using $Na_2S$. The $S^{--}$ ion from $Na_2S$ gives $HS^-$ at the solution pH of the simulated gas absorbing liquor. After the reduction with $Na_2S$ the redox potential and dissolved oxygen content are allowed to stabilise for 10 minutes while a low flow of nitrogen maintains agitation. The solution is then re-oxidised by passing air at a flow rate of 500 mls/min. The dissolved oxygen content and the redox potential are monitored continuously. The oxidation is continued until the redox potential and dissolved oxygen concentration have stabilised. The solution is then de-aerated by passing nitrogen at a flow rate of 500 mls/min, and further reduced by a fresh addition of 3.75 g of $Na_2S$. The procedure of reduction with further $Na_2S$ and subsequent re-oxidation by air blowing (with measurements of dissolved oxygen concentration and redox potential) is carried out three times and the precipitated sulphur is filtered off after each cycle.

RESULTS

The accompanying FIG. 2 shows a schematic diagram of the results obtained from the Cell Test.

The parameters which indicate the efficiency of the catalyst system are:

(i) $t_{20\%}$—time for the solution to reach 20% of the saturation concentration of dissolved oxygen (ii) $t_{80\%}$—time for the solution to reach 80% of the saturation concentration of dissolved oxygen.

(iii) the ratio of Es/Ef, where Es is the redox potential of the system in the fully reduced state and Ef is a measure of the redox potential of the system in an oxidised state. For convenience in our test Ef is taken as the redox potential at $t_{80\%}$.

The results quoted in Table 1 are the average of the data from three cycles of reduction and re-oxidation.

Table I shows a comparison of 2,7-anthraquinone disulphonic acid with the following compounds or mixtures of compounds of the present invention.

A. Tetrasodium N,N'-disulphomethylanthraquinone-2,6/2,7-disulphonamides.

B. Disodium N,N'-disulphomethylanthraquinone-2,6-disulphonoamide

C. Disodium N,N'-disulpho-2-ethylanthraquinone-2,6-disulphonamide

D. Tetrasodium N,N'-disulpho-2-ethylanthraquinone-2,6/2,7-disulphonamides.

E. Tetrasodium N,N'-dicarboxymethylanthraquinone-2,6/2,7-disulphonamides.

F. Tetrasodium salt of N,N'-disulphomethylanthraquinone-2,7-disulphonamide.

G. Tetrasodium salt of N,N'-disulphomethylanthraquinone-1,5-disulphonamide.

H. Tetrasodium salts of N,N'-disulphomethylanthraquinone-1,6/1,7-disulphonamides.

TABLE 1

COMPARISON OF PRODUCTS OF THE PRESENT INVENTION WITH 2.7 ADA

| Example | CATALYST | DISSOLVED OXYGEN MEASUREMENTS | | POTENTIAL MEASUREMENTS | | RATIO OF Es/Ef |
|---|---|---|---|---|---|---|
| | | $t_{20\%}$ mins | $t_{80\%}$ mins | Es mv | Ef mv | |
| COMPARISON | 2,7 ADA | 9 | 16 | −430 | −197 | 2.2 |
| 1 | COMPOUND A | 9 | 18 | −411 | −175 | 2.4 |
| 2 | COMPOUND B | 7 | 10 | −439 | −180 | 2.4 |
| 3 | COMPOUND C | 14 | 22 | −420 | −175 | 2.4 |
| 4 | COMPOUND D | 7 | 24 | −455 | −57 | 2.9 |
| 5 | COMPOUND E | 4 | 8 | −477 | −188 | 2.5 |
| 6 | COMPOUND F | 8 | 15 | −404 | −161 | 2.5 |
| 7 | COMPOUND G | 7 | 9 | −392 | −86 | 4.5 |
| 8 | COMPOUND H | 7 | 9 | −401 | −148 | 2.7 |

Some of the reactions by which formerly-gaseous oxygen is fixed in solution are ionic in nature and are comparatively rapid. Generally, as long as there remain ionic compounds in a reduced state in the liquor the dissolved oxygen content remains at 5% or less of the saturation concentration of dissolved oxygen in the liquor. Therefore, whether these components of the solution are in reduced or oxidised state can be determined by measuring the dissolved oxygen concentration. The re-oxidation times $t_{20\%}$ and $t_{80\%}$ therefore give indications of the rate of system re-oxidation in the presence of the various catalysts.

The process, being an oxidative process, is dependent upon redox couples. The degree of oxidation of the solution determines the redox potential. Thus the degree of oxidation is measured instantly by measuring the redox potential.

The liquor consists of a mixture of at least three redox couples. The single electrode potential is related logarithmically to the concentration of the oxidised and reduced species in solution:

$$\text{Potential} = \text{Standard Potential} + \text{constant} \times \log_{10} \frac{\text{(Concentration of Oxidised forms)}}{\text{(Concentration of Reduced forms)}}$$

The ratio of Es/Ef has been taken by other workers to indicate the degree of re-oxidation that has occurred. The effectiveness of a catalyst can be decided from the combination of dissolved oxygen measurements and redox potential measurements. The results generally obtained with the Cell test appear to fall into three main types:

(i) those which have long times to $t_{20\%}$ (i.e. 30 mins. or greater) but have a high ratio of Es/Ef (i.e. 2.2 or greater).

(ii) those which have intermediate times to $t_{20\%}$ (i.e. about 10 mins) and a high ratio of Es/Ef (i.e. 2.2 or greater).

(iii) those which have fast times to $t_{20\%}$ (i.e. 1–3 mins) but have a low ratio of Es/Ef (i.e. <2.0).

The interpretation of these results is that type (i) is a slow but effective catalyst, type (ii) is an effective catalyst, and type (iii) is an ineffective catalyst.

When the dissolved oxygen concentration in the solution has reached 20% of the saturation concentration the majority of the redox reaction has taken place. There is ample dissolved oxygen available so the time from $t_{20\%}$ to $t_{80\%}$ is mainly a function of the reactivity of the catalyst. Therefore, the smaller the time interval between $t_{20\%}$ and $t_{80\%}$ the more easily the catalyst is reoxidised and provided the ratio of Es/Ef is greater than 2.2, the more effective the catalyst would be in the system.

It can be seen that the compounds of formula I all fall into the type (ii) category and have activity at least as good or superior to that of 2,7-anthraquinone disulphonic acid.

What we claim is:

1. A process for the absorption and subsequent removal as sulphur of hydrogen sulphide from gases, gas mixtures or liquid hydrocarbons which comprises
    washing the gas, gas mixture or liquid hydrocarbon containing hydrogen sulphide with an aqueous alkaline solution of (a) one or more anthraquinone sulphonamides of formula I

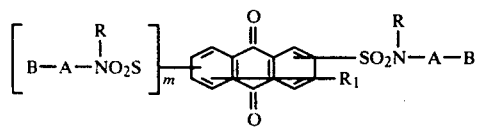

wherein
   A is a $C_1$-$C_4$ straight or branched chain alkylene radical
   B is a —$SO_3M$, —$CO_2M$, —$PO_3HM$ or —$PO_3M_2$ grouping where
   M is hydrogen or a cation giving a water-soluble derivative,
   R is hydrogen, a cation giving a water-soluble derivative or $C_1$-$C_4$ straight or branched chain alkyl,
   $R_1$ is hydrogen, methyl or —COOH, and m is 0 or 1, and
(b) one or more compounds of a metal having at least two valency states,
   whereby the hydrogen sulphide is oxidised and sulphur is liberated, and the reduced anthraquinone sulphonamide is oxidised by contact with free oxygen or a gas containing it.

2. A process according to claim 1 wherein the aqueous alkaline solution contains one or more chelating or sequestering agents for retaining the metal compound in solution.

3. A process as claimed in claim 1 in which in the formula I, B is a —$SO_3M$ grouping, $R_1$ is hydrogen, M and R are hydrogen, sodium, potassium or ammonium, A is methylene or ethylene and m is 1.

4. A process as claimed in claim 1 in which the compound of formula I is the di- or tetra-sodium, potassium or ammonium salt of:
   N,N'-disulphomethylanthraquinone-2,6-disulphonamide,
   N,N'-disulphomethylanthraquinone-2,7-disulphonamide,
   N,N'-disulphomethylanthraquinone-1,5-disulphonamide,
   N,N'-disulpho-2-ethylanthraquinone-2,6-disulphonamide,
   N,N'-dicarboxymethylanthraquinone-2,6-disulphonamide, or any mixture thereof.

5. A process as claimed in claim 1 in which the metal having at least two valency states is vanadium 6. A process as claimed in claim 5 in which the effective ratio by weight of the compound of formula I to the vanadium compound is in the range of 3:1 to 1:2.

* * * * *